United States Patent [19]
Maecker et al.

[11] Patent Number: 5,948,840
[45] Date of Patent: Sep. 7, 1999

[54] SYNDIOTACTIC VINYLAROMATIC POLYMERS HAVING IMPROVED CRYSTALLIZATION KINETICS

[75] Inventors: Norbert L. Maecker, Shepherd, Mich.; Joseph J. Fay, Newark, Del.

[73] Assignee: The Dow Chemical Company, Midland, Mich.

[21] Appl. No.: 09/029,563

[22] PCT Filed: Nov. 14, 1996

[86] PCT No.: PCT/US96/18064

§ 371 Date: Mar. 2, 1998

§ 102(e) Date: Mar. 2, 1998

[87] PCT Pub. No.: WO97/19986

PCT Pub. Date: Jun. 5, 1997

Related U.S. Application Data

[60] Provisional application No. 60/007,828, Nov. 30, 1995.

[51] Int. Cl.$^6$ .................................................. C08K 5/5333
[52] U.S. Cl. ............................ 524/132; 524/130; 524/577; 526/347; 526/347.2
[58] Field of Search .................................... 524/139, 577, 524/130, 132; 526/347, 347.2

[56] References Cited

U.S. PATENT DOCUMENTS

| | | | |
|---|---|---|---|
| 5,034,441 | 7/1991 | Nakano et al. | 524/577 X |
| 5,326,813 | 7/1994 | Okada et al. | 524/577 X |
| 5,362,783 | 11/1994 | Eiffler et al. | 524/611 X |

*Primary Examiner*—Fred Teskin

[57] ABSTRACT

Claimed is a polymer composition comprising a syndiotactic vinyl aromatic polymer and from 0.1 to 5.0 weight percent of an alkaline earth metal bis(monoethyl(3,5-di-t-butyl-4-hydroxybenzyl)phosphonate) crystallization modifier.

5 Claims, No Drawings

SYNDIOTACTIC VINYLAROMATIC POLYMERS HAVING IMPROVED CRYSTALLIZATION KINETICS

CROSS REFERENCE TO RELATED APPLICATION

This application claims benefit of priority from Provisional Application No. 60/007,828, filed Nov. 30, 1995.

This invention relates to a composition of matter comprising a highly syndiotactic vinyl aromatic polymer and a crystallization modifier. The invention further relates to a method of controlling the crystallization temperature of a highly syndiotactic vinyl aromatic polymer by intimately blending therein a crystallization modifier. Finally, the present invention relates to an article of manufacture, especially a film, formed from the above polymer composition.

Highly syndiotactic homopolymers and interpolymers of vinylaromatic monomers are well known in the art. Such polymers possess an extremely high crystalline melt temperature, Tm. For example highly syndiotactic polystyrene possesses a Tm of approximately 270° C. Thus, such polymers are highly suited for the manufacture of articles that are exposed to high heat environments. Also, due to the crystalline nature of such polymers, they are well suited for manufacture of articles requiring improved solvent resistance. In fact, at the present time there are no known room temperature solvents for syndiotactic vinylaromatic polymers, especially syndiotactic polystyrene. This fact makes such polymers highly useful in applications requiring both solvent resistance and high temperature resistance. Examples include automotive parts that are exposed to solvents or fuels, and films for protective wrapping especially for use in corrosive environments. Disadvantageously, syndiotactic vinylaromatic polymers crystallize extremely rapidly from the melt and form relatively large crystals that render the polymer opaque or partially opaque. This is because the temperature of crystallization of such polymers is also rather high. Consequently, only slight cooling initiates rapid crystallization and disadvantageously limits the type and quantity of operations that may be performed on the polymer prior to onset of crystallization. For example, drawing and tentering operations for films of conventional syndiotactic vinylaromatic polymers must be performed at elevated temperatures in order to avoid onset of crystallization or else they must be performed too rapidly to be convenient for commercial operations. Moreover, the presence of large crystallites of such polymers limits the applications of resulting products to those articles where transparency is not required.

One attempt to modify the crystallization kinetics of vinylaromatic polymers has involved the use of interpolymers. For example, highly syndiotactic copolymers of styrene and a ring alkyl-substituted styrene, particularly p-vinyltoluene, have a significantly lower crystallization temperature (Tc) than syndiotactic polystyrene itself. Disadvantageously, such copolymers also possess a lower crystalline melt temperature, Tm, thereby limiting the ultimate use temperature of articles made from such interpolymers. Moreover, copolymerizations are inherently more complex and expensive processes that require separate monomer purification and handling equipment as well as more complex recycle and recovery procedures. These result in added costs for such interpolymers. Also, the crystal size of such interpolymers still is too large for highly transparent articles. Thus the use of copolymers to control the crystallization temperature of these polymers is not entirely successful. Finally, it would also be desirable to be able to adjust the crystallization properties of copolymer products independently of the quantity of comonomer therein in order to provide more flexibility to even copolymer products.

Accordingly, there remains a need to produce highly syndiotactic vinylaromatic polymers having altered crystallization kinetics, particularly a reduced crystallization temperature, in a cost effective manner, without detrimental reduction in the crystalline melting point, Tm, thereof.

The present invention provides a polymer composition comprising:

(a) a highly syndiotactic vinyl aromatic polymer; and
(b) from 0.1 to 5.0 percent based on the polymer weight of a crystallization modifier selected from the group consisting of alkaline earth metal bis(monoethyl(3,5-di-t-butyl-4-hydroxybenzyl)phosphonate) salts.

The present invention also provides an article of manufacture, such as an injection molded article or a film formed from the present polymer composition. Finally there is provided a method of controlling the crystallization rate of a syndiotactic vinyl aromatic polymer, comprising forming a melt of said polymer and substantially homogeneously dispersing therein from 0.1 to 5.0 percent, based on the polymer weight, of a crystallization modifier selected from the group consisting of alkaline earth metal bis(monoethyl (3,5-di-t-butyl-4-hydroxybenzyl) phosphonate) salts.

The term "polymer" as used herein refers to a polymeric compound prepared by polymerizing vinylaromafic monomers alone or in combination. The generic term polymer thus embraces the term "homopolymer", employed to refer to polymers prepared from only one monomer, and the term "interpolymer" or "copolymer" which refers to polymers prepared by the polymerization of at least two different monomers.

Suitable vinyl aromatic monomers for use in the present invention are represented by the formula: $CH_2=CR-Ar$, wherein:

R is hydrogen or $C_{1-6}$ alkyl, and

Ar is phenyl or a phenyl group substituted with from 1 to 5 moieties independently selected from the group consisting of halo, $C_{1-6}$ alkyl, and $C_{1-6}$ haloalkyl. Exemplary vinylaromatic monomers include styrene, vinyl toluene (all isomers individually or in admixture), α-methylstyrene, t-butyl styrene (all isomers individually or in admixture), and bromostyrene (all isomers individually or in admixture).

Preferred syndiotactic vinylaromatic polymers to be employed as component (a) are such polymers having a degree of syndiotacticity as measured by a racemic triad of the $^{13}C$ NMR spectrum of at least 75 percent and most preferably at least 90 percent. In addition the syndiotactic vinyl aromatic polymer preferably has a weight-average molecular weight of 10,000 to 2,000,000, more preferably 100,000 to 500,000. The syndiotactic vinyl aromatic polymer preferably has a crystalline melting point from 150 to 275° C. Highly preferred syndiotactic vinyl aromatic polymers include syndiotactic polystyrene and syndiotactic copolymers of styrene and vinyltoluene containing up to 25 percent vinyltoluene by weight. A most preferred syndiotactic vinyl aromatic polymer is syndiotactic polystyrene.

The syndiotactic vinyl aromatic polymer may be suitably modified by elastomers to improve its impact properties. Examples of suitable elastomers are homopolymers of $C_{4-6}$ conjugated dienes, especially butadiene or isoprene; interpolymers of one or more vinyl aromatic monomers and one or more $C_{4-6}$ conjugated dienes, especially butadiene or isoprene: interpolymers of ethylene and propylene or of ethylene, propylene and a nonconjugated diene, especially 1,6-hexadiene or ethylidene norbomene; homopolymers of $C_{4-6}$ alkyl acrylates: interpolymers of $C_{4-6}$ alkyl acrylates and an interpolymerizable comonomer, especially a vinyl aromatic monomer or a $C_{1-4}$ alkyl methacrylate. Also included are graft polymers of the foregoing rubbery polymers wherein the graft polymer is a vinyl aromatic polymer. A preferred vinyl aromatic monomer for use in all of the foregoing rubbery polymers is styrene. The above elastomers may be prepared by anionic solution polymerization techniques or by free radically initiated solution, mass, emulsion or suspension processes. The elastomers prepared by emulsion polymerization may be agglomerated to produce larger particles having a multimodal particle size distribution if desired.

Suitable alkaline earth metal bis(monoethyl(3,5-di-t-butyl-4-hydroxybenzyl) phosphonate) salt crystallization modifiers especially include calcium bis(monoethyl(3,5-di-t-butyl-4-hydroxybenzyl) phosphonate). The amount of such crystallization modifier used preferably is from 0.2 to 2.0 percent based on syndiotactic vinylaromatic polymer weight.

The polymer compositions of the present invention can be prepared by any conventional compounding operation, such as for example single and twin screw extruders, Banbury mixers, Brabender mixers, Farrel continuous mixers, and two roll mixers. The additives and syndiotactic vinylaromatic polymer are mixed at mixing temperatures that are above the softening or melting point of the polymer. For best results it is necessary to thoroughly disperse the crystallization modifier through the polymer mass. For this reason it is necessary to incorporate the additive into a melt of the desired vinylaromatic polymer.

The polymer compositions of the present invention may further comprise additives, such as for example thermal stabilizers, UV stabilizers, fillers, fibrous reinforcing agents, antioxidants, process aids, colorants, UV stabilizers, compatibilizers and flame retardants as well as additional polymers designed to alter the physical properties of the resulting blend, or to compatibilize such blends. Examples of such polymers include polyaryiethers, especially polyphenylene ether, polypropylene, and maleic anhydride modified polyphenylene ether (MAPPO) or fumaric anhydride modified polyphenylene ether (FAPPO).

The polymer composition of the present invention can be fabricated into films, sheet, moldings, foam sheet pre-forms, blow molded articles, and foam plank articles by conventional processes. Suitable processes for such fabrication include: injection molding, compression molding, blow molding, extrusion, cost film, film tentering, blown film and thermoforming processes. An article may be prepared in a one-step process or two-step process. In a one-step process, the mixing of the polymer and the crystallization modifier (and optionally any other additives) is performed on an apparatus having adequate mixing capability which prepares a substantially homogeneous, molten resin for further fabrication. In the two-step process, the polymer composition is first prepared in a granular form by a suitable melt-mixing and pelletizing means, and the granules are later remelted and utilized in a conventional fabrication process.

The preferred use for the polymer composition of the present invention is in the formation of film products having thickness from 0.01 mm to 1 mm, preferably by the blown film or extrusion-tentering film process.

The invention will be further illustrated by the following examples, without limiting the invention thereto. Unless stated to the contrary all parts and percentages are based on weight.

EXAMPLES 1–10

In the examples that follow, the following components were used:

SPS: a homopolymer of styrene having syndiotacticity of greater than 95 mole percent and a molecular weight (Mw) of 330,000.

SPV: a copolymer of styrene and p-vinyl toluene containing 4 percent p-vinyl toluene content, syndiotacticity of greater than 95 mole percent and a molecular weight (Mw) of 410,000.

CBM calcium bis(monoethyl(3,5-di-t-butyl-4-hydroxybenzyl) phosphonate) (available from Ciba-Corporation as Irganox 1425 for use as a polymer thermal stabilizer).

Polymer pellets were prepared from SPS or SPV with and without the addition of CBM crystallization modifier. The composition of the pellets as well as their crystallization properties are listed in Table 1 The components were compounded on a 0.8 inch (20 mm) Welding Engineers extruder at approximately 300° C., extruded into a strand, cooled in a room temperature water bath and pelletized for testing of crystallization properties. Tcc temperature of crystallization measured while heating from the solid state), Tch temperature of crystallization measured while cooling from the melt) and Tm (crystalline melting point) were determined by differential scanning calorimetry (DSC) using a Dupont instruments, model 2910 Differential Scanning Calorimeter, while heating to 300° C. at 20°C./min and cooling at the some rate. Results are contained in Table 1.

TABLE 1

| Run | polymer | CBM (percent) | Tcc (° C.) | Tch (° C.) | Tm (° C.) | clarity[1] |
|---|---|---|---|---|---|---|
| 1 | SPS | 0 | 155 | 230 | 271 | opaque |
| 2 | " | 0.1 | 161 | 225 | 271 | hazy |
| 3 | " | 0.5 | 160 | 223 | 271 | p-hazy |
| 4 | " | 1.0 | 166 | 220 | 271 | clear |
| 5 | " | 2.0 | 168 | 216 | 273 | clear |
| 6 | SPV | 0 | 163 | 218 | 260 | hazy |
| 7 | " | 0.1 | 166 | 210 | 263 | p-hazy |
| 8 | " | 0.5 | 173 | 207 | 265 | clear |
| 9 | " | 1.0 | 173 | 206 | 265 | clear |
| 10 | " | 2.0 | 173 | 206 | 258 | clear |

[1]qualitative clarity of substantially fully crystalline, injection molded specimens, molded at 150° C. mold temp. (p-hazy = partly hazy).

By reference to the above results it may be seen that similar crystallization kinetics are attained in a homopolymer of syndiotactic polystyrene containing, for example, 1 weight percent calcium bis(monoethyi(3,5-di-t-butyl-4-hydroxybenzyl)phosphonate) as is attained in a styrene/p-vinyltoluene copolymer containing 4 weight percent comonomer (Tcc=166° C. vs 163° C. Tch=220° C. vs 218° C.) without loss of crystalline melting properties (tm=271° C. vs 260° C.), in addition the presence of the additive resulted in greater polymer clarity in the above injection molded specimens, which is believed to be due to smaller crystallite domain size in the presence of the crystallization modifier. A similar improvement in copolymer properties by addition of the same compound as well as improved clarity of the resulting resin is also attained.

What is claimed is:

1. A polymer composition comprising:
   (a) a highly syndiotactic vinyl aromatic polymer; and
   (b) from 0.1 to 5.0 percent, based on the polymer weight of a crystallization modifier selected from the group consisting of alkaline earth metal bis(monoethyl(3,5-di-t-butyl-4-hydroxybenzyl)phosphonate) salts.

2. A polymer composition according to claim 1 wherein the crystallization modifier is calcium bis(monoethyi(3,5-di-t-butyl-4-hydroxybenzyl) phosphonate).

3. A polymer composition according to claim 1 wherein the syndiotactic vinyl aromatic polymer is syndiotactic polystyrene or a syndiotactic copolymer of styrene and vinyltoluene.

4. An injection molded article comprising a polymer composition according to claim 1.

5. A film article comprising a polymer composition according to claim 1.

* * * * *